United States Patent [19]
Stoll

[11] Patent Number: 5,570,717
[45] Date of Patent: Nov. 5, 1996

[54] DISTRIBUTOR DEVICE

[75] Inventor: Kurt Stoll, Esslingen, Germany

[73] Assignee: Festo KG, Esslingen, Germany

[21] Appl. No.: 333,850

[22] Filed: Nov. 3, 1994

[30] Foreign Application Priority Data

Nov. 27, 1993 [DE] Germany ............. 93 18 183.3

[51] Int. Cl.⁶ ..................................... F16L 27/12
[52] U.S. Cl. .......................... 137/580; 285/325
[58] Field of Search ............. 137/580; 285/188, 285/325

[56] References Cited

U.S. PATENT DOCUMENTS

| | | | |
|---|---|---|---|
| 2,798,506 | 7/1957 | Baker et al. | 137/580 |
| 3,012,574 | 12/1961 | Baker et al. | 137/580 |
| 3,268,174 | 8/1966 | Boone | 137/580 X |
| 3,310,067 | 3/1967 | Meyer | 137/580 |
| 3,913,470 | 10/1975 | Cullen | 137/580 X |
| 3,952,492 | 4/1976 | Miyazaki et al. | 57/34.5 |
| 4,072,355 | 2/1978 | Pentith | 137/580 X |
| 4,117,773 | 10/1978 | Johnson | 137/580 X |
| 4,233,889 | 11/1980 | Nederman | 137/580 X |

FOREIGN PATENT DOCUMENTS

| | | |
|---|---|---|
| 2114186 | 9/1972 | Germany . |
| 2430439 | 2/1975 | Germany . |
| 3346111 | 10/1984 | Germany . |
| 3509157 | 3/1986 | Germany . |
| 2172385 | 9/1986 | United Kingdom . |
| 2211591 | 7/1989 | United Kingdom . |

Primary Examiner—John Rivell
Attorney, Agent, or Firm—Hoffmann & Baron

[57] ABSTRACT

A distributor device for compressed air and/or other fluid. The distributor device possesses a distributor housing with a distributor space opening at a longitudinal slot. Adjacent to the longitudinal slot two mutually opposite sealing bars are provided. On the rear side of each such sealing bar there is a secondary pressure space provided in addition to the distributor space and which is arranged to be acted upon by pressure fluid in order to thrust the sealing bar against each other in a sealing fashion. It is in this manner that a reliable sealing action is provided independently of any residual plastic deformation of the material of the sealing bars.

11 Claims, 2 Drawing Sheets

DISTRIBUTOR DEVICE

BACKGROUND OF THE INVENTION

The invention relates to a distributor device for compressed air and/or other, more particularly gaseous fluids, comprising a distributor housing, in which a space for the fluid to be distributed is provided, said housing defining a longitudinal slot thereon, two sealing bars serving for sealing the distributor space at the longitudinal slot and extending along the longitudinal slot, said sealing bars being arranged opposite to each other and respectively adjacent to one of two edges of the slot and adapted, using the effect of a pressure fluid acting on backs thereof, to be thrust toward each other, and a tapping device adapted to be run along the longitudinal slot, said tapping device having an opening body, serving for the transmission of the fluid and fitting between the two sealing bars, same then being locally thrust apart.

Such a distributor device for compressed air is disclosed in the German patent publication 3,346,111C1. It possesses an elongated distributor housing, in which the distributor space, able to be filled with compressed air, is located. The longitudinal slot of the housing is open toward such distributor space the is sealed by means of two lip-shaped, molded sealing bars. The opening or spreading body of the tapping device possesses a shuttle-like form and is introduced between the two sealing bars. By changing the axial position of the tapping device it is possible to shift the point of tapping in order to have compressed air available at different positions in accordance with requirements.

If the tapping device is shifted after a longish period of time without use, it can be the case that the sealing bars do not completely and immediately close at the position previously occupied by the opening body owing to temporary plastic deformation. Therefore there may for some time be losses through leakage, something which will also be a disadvantage as regards the pressure level in the distributor space.

SHORT SUMMARY OF THE INVENTION

One object of the invention is to provide a distributor device of the sort noted initially in the case of which the distributor space adjacent to the slot is reliably sealed independently of the duration of time in which the tapping device was held in certain positions.

In order to achieve these and/or other objects appearing from the present specification, claims and drawings, in the present invention on the back side of each respective sealing bar a secondary pressure space is defined in addition to the distributor space, such space extending along the associated sealing bar, means being provided for the supply of pressure fluid to such secondary pressure space, each such secondary pressure space being delimited by a wall section constituted by the associated sealing bar or being transversely movable in order to act on such sealing bar.

The pressure obtaining in the secondary pressure spaces now ensures that the sealing bars are firmly thrust toward each other in the parts arranged adjacent to the opening body and then come into snug sealing contact with one another, even if the tapping device has been kept in one and the same position for some time. Any tendency toward permanent deformation of the sealing bars is prevented or compensated for by the pressure fluid acting on the backs of the sealing bars. In the case of the pressure fluid located in the secondary pressure spaces it is a question more particularly of compressed air. Said pressure fluid may originate from any pressure fluid source and is more particularly taken from a distributor device for compressed air or other gaseous fluids, preferably from the distributor assembly, for which purpose suitable linking channels in the housing can be provided.

Further advantageous forms of the invention are recited in the claims.

In the case of one preferred embodiment a respective sealing bar is constituted by a wall portion of a hose member, which can be inflated by means of the pressure fluid so that the sealing bars are thrust together at all times. Such a design is relatively simple and furthermore provides sealing in a trouble-free manner.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
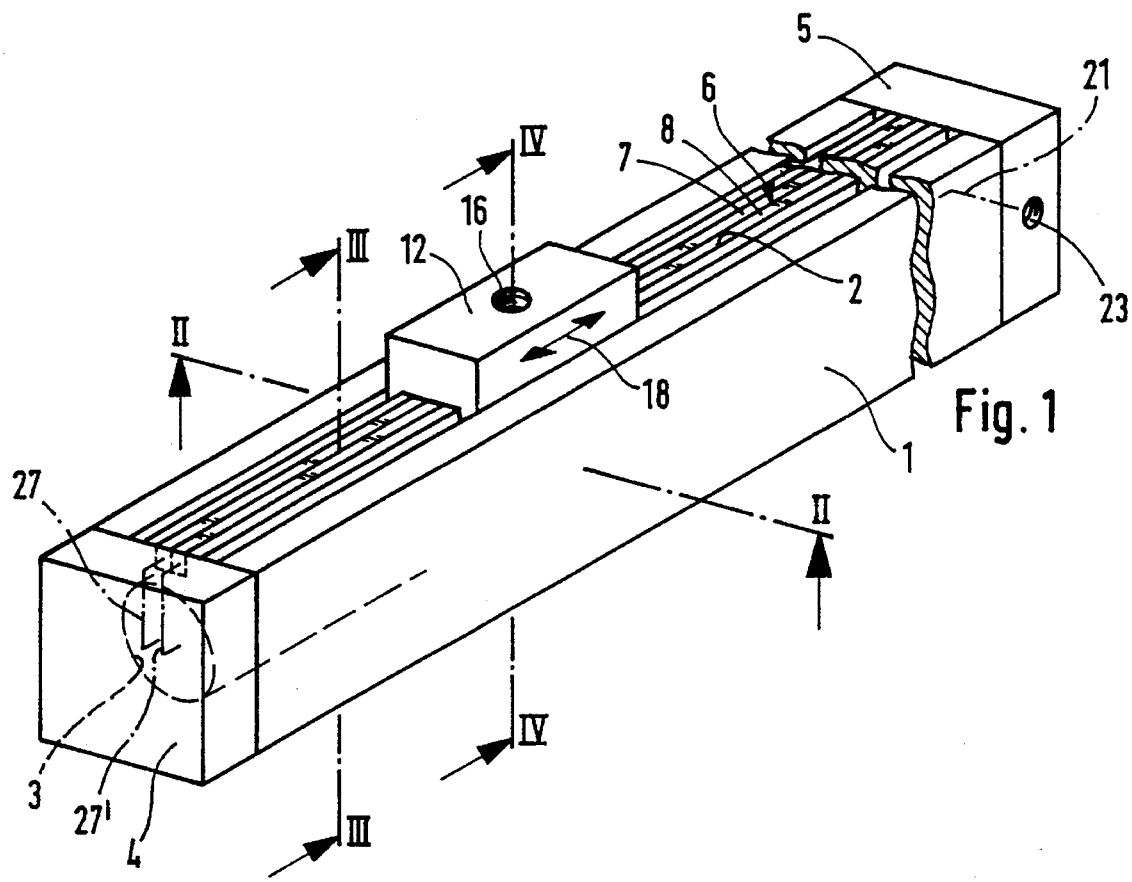
FIG. 1 shows in perspective a first embodiment of the distributor device in accordance with the invention which is designed for the distribution of compressed air or other gaseous fluids.

The distributor device here described comprises a tubular elongated distributor housing 1, which at one point on its periphery has a longitudinal slot 2 extending radially and axially. The longitudinal slot 2 opens at the long side into the surroundings and radially inward into the interior of the distributor housing, same constituting a distributor space 3. In such distributor space 3 there is the fluid to be distributed, in the case of which it may for example be a question of compressed air or another gaseous fluid. Other fluids as well could be distributed with the novel distributor device and even the distribution of electrical energy would be conceivable.

The distributor space 3 is sealed hermetically all the way around it. For this purpose the ends of the distributor housing 1 have end pieces 4 and 5 mounted thereon and along the longitudinal slot 2 there is a flexible sealing arrangement 6 extending right along the length of the slot.

The sealing arrangement 6 comprises two sealing bars 7 and 8, which are respectively arranged adjacent to one of the two edges of the longitudinal slot 2 and normally abut together with the formation of a sealing contact.

A tapping device 12 adapted to run along the distributor housing 1 longitudinally has an opening body 13 extending between the two sealing bars 7 and 8 into the distributor space 3. The opening body 13 serves to tap fluid from the distributor space 3 in which it is contained and pass it to the outside. For this purpose the tapping device 12 is provided with a plurality of transfer ducts or, as illustrated in the figure, with one duct 14, which at one end (at 15) opens into the terminal part, extending into the distributor space 3, of the opening body 13 and at the other end communicates with a connection opening 16 accessible from the outside, with which a pressure duct or hose or the like can be connected leading to other parts of the equipment. Adjacent to the opening body 13 the transfer duct 14 may have a flat, rectangular cross section (see FIG. 2).

Figure 2:
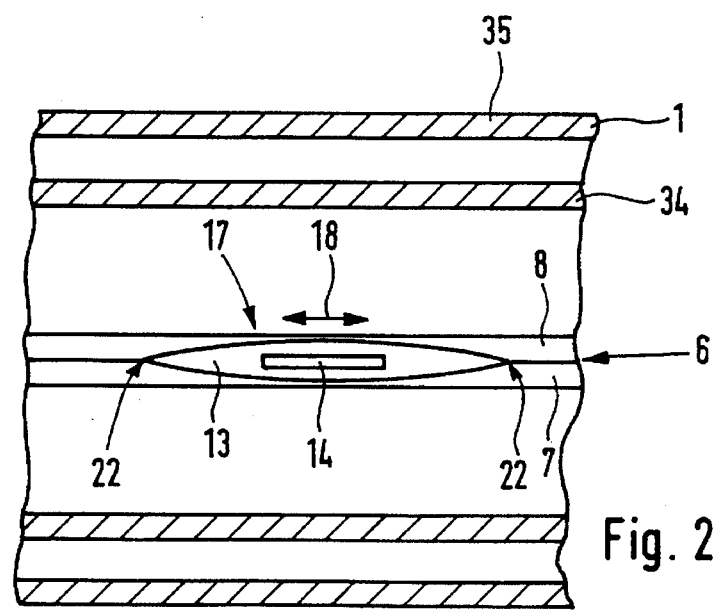
FIG. 2 is a longitudinal section taken through the distributor device of FIG. 1 on the line II—II adjacent to the tapping device.
Figure 3:
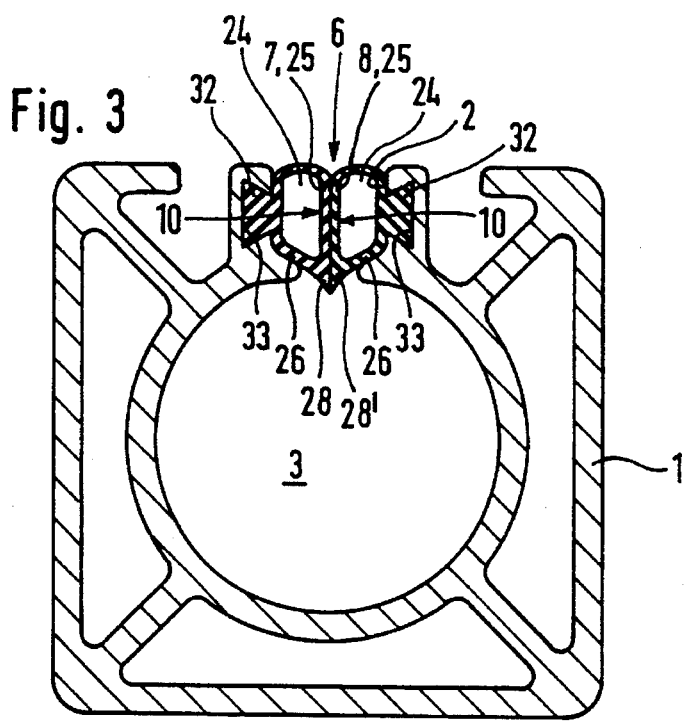
FIG. 3 shows a cross section taken through the distributor device of FIG. 1 taken on the line III—III.

The opening or spreading body 13 is preferably an elongated, rail-like part, as is particularly clearly indicated in FIG. 2. At the point at which the opening body 13 fits between the sealing bars 7 and 8—in what follows referred as the tapping point 17—the sealing bars 7 and 8 are spread apart or opened out, as may be seen from a glance at FIGS. 3 and 4. The opened out state is to be seen in FIG. 4. Owing to their flexibility the sealing bars snugly engage the lateral external surface of the opening body 13 so that the longitudinal slot 2 is also shut off and hermetically sealed at the tap point 17. The sealing bars 7 and 8 preferably consist of a material with rubber-elastic properties, more particularly rubber itself or an elastomer.

The tapping device 12 can be moved along the longitudinal slot as indicated by the arrow, the position of the tapping point 17 then being changed, at which the pressure fluid is let off from the distributor space 3. This shifting may be performed by power driven means or preferably by hand. Since the sealing bars 7 and 8 press against the opening body 13, the same is held by friction in every position thereof.

The parts of the sealing arrangement 6 adjoining the two ends 22 of the opening body 13 in the direction 18 of shifting are particularly critical as regards sealing, since it is here that the spreading action commences. Therefore in the present embodiment of the invention the opening body 13 is tapered at its ends 22, this meaning that there are sharp edges which ensure a smooth transition of the sealing bars 7 and 8 between the unspread or closed and the spread parts. Preferably the body 18 has an outline in plan similar to the form of an elongated shuttle, whose thickness as measured in the transverse direction of the slot gradually increases from either end 22 toward the middle. The sealing bars 7 and 8 are consequently spread out farther in the central part of the opening body 13 than adjacent to the ends 22. The end edges divide or move apart the sealing bars 7 and 8 like a knife during shifting of the tapping device 12, and it would be possible to speak of there being a zipper-like manner of operation.

The fluid to be distributed is supplied to the distributor space 3 in the embodiment of the invention via a connection hole 23, which is preferably located in one of the two ends 5 and communicates with the distributor space 3. The connection opening 23 for example renders possible the connection of a pressure fluid line coming from a source of pressure fluid.

Figure 4:
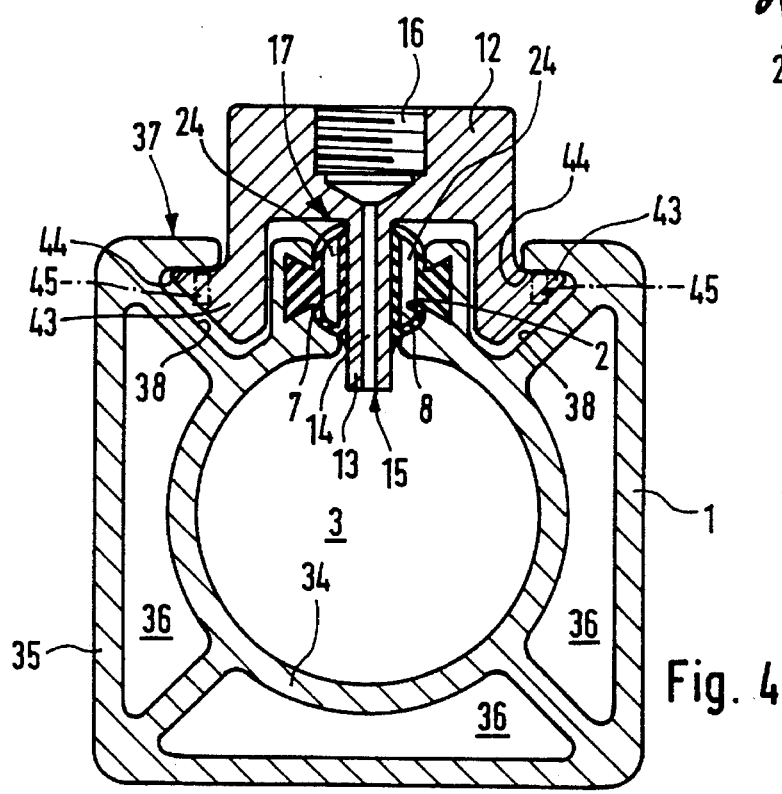
FIG. 4 is a cross section taken through the distributor device of FIG. 1 on the line IV—IV.

In order to ensure that the gap present at the spread out portion between the sealing bars 7 and 8 is immediately closed again hermetically as soon as the tapping device 12 is moved on, at the rear side 10 of each of the two sealing bars 7 and 8 a secondary pressure space 24 is provided which is separate from the distributor space 3, such secondary pressure space 24 extending particularly in a continuous fashion along the full length of the respectively associated sealing bar 7 or 8 and is able to be subjected to the action of pressure fluid. Each secondary pressure space 24 possesses a wall section 25 able to be moved transversely in relation to the longitudinal direction of the slot and which in the embodiment illustrated in FIGS. 1 and 4 is constituted by the associated sealing bar 7 and 8. In the illustrated working embodiment of the invention of FIG. 5 the transversely moving wall section 25 is formed separately from the respectively associated sealing bar 7 or 8, but however is so arranged that it acts on the latter from the rear.

The pressure fluid supplied to the secondary pressure spaces 24 ensures that the sealing bars 7 and 8 are always thrust against one another or, respectively, against the lateral surface of the opening body 13 with the result that there is at all times satisfactory sealing contact.

Figure 5:
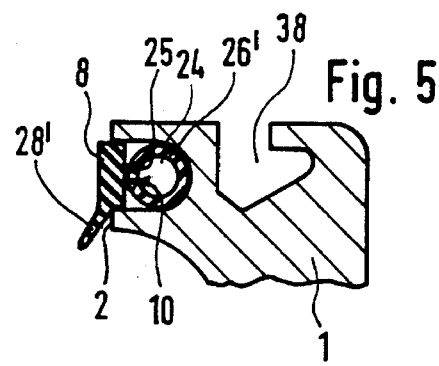
FIG. 5 shows a detail of a further embodiment of the distributor device, the secondary pressure space having been modified.

Both in the illustrated working embodiment of FIGS. 1 through 4 and also in the embodiment of FIG. 5 the two secondary pressure spaces 24, each provided with a sealing bar 7 and 8, are formed in a hose member 26 and 26' anchored to the housing and having a flexible wall preferably consisting of a material with rubber-like properties. In the illustrated working embodiment of the invention of FIGS. 1 through 4 a respective sealing bar 7 or 8 is an integral constituent of the associated hose section 26, that is to say it is part of the wall of this hose member 26. Accordingly only a single component is involved, this presenting a very simple mode of manufacture. In the working embodiment of the invention of FIG. 5 the hose member 26' is made separate from the respective sealing bar 7 or 8, which is placed in front of the respective hose member 26'. If the hose member 26' is placed under pressure, the moving wall section 25 will be thrust against the rear side 10 of the associated sealing bar with the result that the same is for its part thrust toward the oppositely placed sealing bar.

The parts of the hose wall, which do not cooperate with a sealing bar or do not constitute a sealing bar, may be at least chiefly supported by the distributor housing 1, since the hose member 26', as shown in FIG. 5, is for example lodged in a groove in the housing.

The pressure obtaining in the secondary pressure space 24 is preferably adjusted in accordance with the needs of a particular case. It is in this manner that the size of the sealing surfaces or areas of the sealing bar 7 and 8 may be taken into account together with the effect on the thrust forces between the sealing bars 7 and 8 and the setting forces necessary for shifting the tapping device 12. Preferably the secondary pressure spaces 24 are charged with compressed air. As a source of pressure fluid any convenient source available may be employed, as for example a connection with the pressure fluid source supplying the distributor space 3. For this purpose connection openings may be provided externally on the ends 4 and 5 of the housing (not illustrated). The design in accordance with the embodiments of the invention is however neater, in which the secondary pressure spaces 24 communicate within the distributor arrangement with the distributor space 3 and are supplied by the same with fluid under pressure. As shown in FIG. 1 in chained lines, this is ensured for example by having two connecting ducts 27 and 27' formed in one of the two ends 4 of the housing, which on the one hand open at one end into the distributor space 3 and on the other hand open at the other end into one of the secondary pressure spaces 24 of the hose member 26. It will be clear that such connecting ducts 27 and 27' could as well be provided at some other point on the distributor housing 1. In the design of the type indicated it is not necessary to provide additional connection openings externally on the distributor housing 1 for the secondary pressure spaces 24 of the sealing bar 7 and 8.

The sealing bars 7 and 8 are preferably directly accommodated in the part between the two lateral edges of the longitudinal slot 2 so that they do not extend into the distributor space 3 or only do so to a small extent. However it may turn out to be appropriate to mold a sealing lip 28 and 28' on each sealing bar 7 and 8 projecting as far as the distributor space 3 and in the present case running along the full length of the respective sealing bar 7 or 8, such lips being acted on in the closed state of the slot at the rear by the internal pressure in the distributor space 3 so that in the closed setting an additional sealing force will come into play. The sealing lips 28 and 28' are in the present case illustrated in FIGS. 1 through 4 molded integrally on the respective hose member 26 and 26'.

For the attachment of a respective sealing bar 7 or 8 on the housing in the present case as illustrated in FIGS. 1 through 4 on each hose member 26 the holding section 32 is molded on the outer side diametrally opposite to the associated sealing bar 7 and 8. Such holding section 32 is a proud rib and extends more particularly along the entire length of the respective hose member 26. In the working embodiment of the invention it is made with a swallow tail cross section. Each holding section 32 is mounted in a complementary holding groove 33, which is set in the part laterally delimiting the longitudinal slot 2, of the distributor housing. The fitting of the holding section 32 in the associated holding groove 33 is performed either by radially snapping it in or preferably by pushing it in from the end of the housing after removal of one of the ends 4 and 5, since then the holding grooves 33 are open at the end. The axial fixing in place in a respective holding groove 33 is conveniently performed by the housing ends 4 and 5, which in the mounted state cover over the ends of the holding grooves.

It is convenient to manufacture each hose member 26 and 26' of such a flexible material as is not stretched, or is only stretched to an unsubstantial extent, by the pressures obtaining in the individual applications of the equipment. The change in cross section necessary during shifting of the opening body 13, of a respective secondary pressure space 24 is in this respect essentially simply by a change in the configuration of the shape of the wall of each hose member 26 and 26'.

In the present case the distributor housing 1 has a rectangular and in this respect preferably square outline. Preferably it is a question of extruded material of aluminum. In order to save weight it is possible to provide a plurality of cavities 36 which are continuous in the length direction between an inner housing wall 34 delimiting the distributor space 3 and an outer housing wall 35 determining the outline. The outline set by the inner housing wall 34 of the distributor space 3 is preferably circular.

The tapping device 12 is in the case of such an arrangement merely supported adjacent to one of the four outer surfaces. Therefore the remaining three outer surface are available for assembly purposes or the like. They are in no way obstructed by the tapping device 12.

The tapping device 12 itself is carried adjacent the said one outer surface 37 in two guide grooves 38 provided on either side of the longitudinal slot 2 for longitudinal motion. The guide grooves 38 are set in the outer surface 37 of the distributor housing 1 and extend for the full length of the housing. On the tapping device 12 at least two guide portions 43 are arranged, which fit respectively in one of the guide grooves 38. They are preferably made with a hook-like cross section so that they hook around a respective guide surface 44 provided in the respective guide groove, which surfaces 44 prevent them from being removed athwart the direction of shift 18. If a pulling force is exerted on the tapping device 12 athwart the longitudinal direction of the slot and radially outward the guide portions 43 hooking around the guide surfaces 44 will be thrust against the guide surfaces 44 facing groove floor and prevented from further transverse movement. This is in line with a preferred use of the distributor device in a vertical position, that is to say so that the longitudinal slot 2 is itself vertical.

In order to keep the force required necessary for shifting the tapping device 12 as low as possible, it is preferred to provide one or more runner wheels 45 as shown in chained lines between the guide portions 43 and the guide surfaces 44 so that they roll along the guide surfaces 44 during travel of the tapping device 12.

The supply of fluid under pressure to the secondary pressure spaces 24 responsible for thrusting the sealing bars 7 and 8 may furthermore be so regulated that the pressure is reduced briefly for such travel in order to reduce the frictional forces and facilitate the travel of the tapping device.

I claim:

1. A distributor device for compressed air, comprising a distributor housing, in which a space for the fluid to be distributed is provided, said housing defining a longitudinal slot thereon, two sealing bars serving for sealing the distributor space at the longitudinal slot and extending along the longitudinal slot, said sealing bars being arranged opposite to each other and respectively adjacent to one of two edges of the slot and adapted, using the effect of a pressure fluid acting on backs thereof, to be thrust toward each other, and a tapping device adapted to be run along the longitudinal slot, said tapping device having an opening body, serving for the transmission of the fluid and fitting between the two sealing bars, same then being locally thrust apart, wherein on the back side of each respective sealing bar a secondary pressure space is defined in addition to the distributor space, such space extending along the associated sealing bar, means being provided for the supply of pressure fluid to such secondary pressure space, each such secondary pressure space being delimited by a wall section constituted by the associated sealing bar or being transversely movable in order to act on such sealing bar, wherein said distributor housing includes at least one connection duct formed in a wall section thereof for connecting said secondary pressure spaces with said distributor space whereby both said secondary pressure spaces and said distributor space fluidly communicate with a common source of pressure fluid.

2. The distributor arrangement as set forth in claim 1, comprising a hose member secured to the distributor housing in which each such secondary pressure space is formed.

3. The distributor arrangement as set forth in claim 2, wherein each sealing bar is directly constituted by a wall section on one of the hose members.

4. The distributor arrangement as set forth in claim 2, comprising a holding section extending on each hose member in the longitudinal direction, over which the hose member is fixed in a holding groove provided in the distributor housing.

5. The distributor arrangement as set forth in claim 2, wherein the wall of each such hose member comprises a material with rubber-elastic properties.

6. The distributor arrangement as set forth in claim 1, wherein the sealing bar are placed between the slot edge of the distributor housing and preferably at least substantially radially outside the distributor space.

7. The distributor arrangement as set forth in claim 1, comprising a sealing lip on each sealing bar, said lips extending along the sealing bars and dimensioned to project into said distributor space when said sealing bars are in a closed state whereby pressure fluid acting on respective rearward surfaces thereof urge said lips towards one another thereby facilitating the sealing of said distributor space.

8. The distributor arrangement as set forth in claim 1, wherein the tapping device is mounted for longitudinal movement in two guide grooves provided on the housing on each side of the longitudinal slot in the outer periphery of the distributor housing.

9. The distributor arrangement as set forth in claim 8, wherein the tapping device possesses hooked guide portions fitting into the guide grooves and which so fit around the guide surface of the guide grooves that the tapping device is secured and prevented from being taken from the distributor housing transversely in relation to its direction of travel thereon.

10. The distributor arrangement as set forth in claim 9, comprising runner wheels on the guide portions adapted to run along the guide surfaces of the guide surface.

11. The distributor arrangement as set forth in claim 8, wherein the distributor housing has a rectangular outline, the tapping device being supported exclusively on one of the four outer surface and the remaining three outer surface are clear of such tapping device.

* * * * *